US009232309B2

(12) United States Patent
Zheng et al.

(10) Patent No.: US 9,232,309 B2
(45) Date of Patent: Jan. 5, 2016

(54) MICROPHONE ARRAY PROCESSING SYSTEM

(75) Inventors: Zhonghou Zheng, Shanghai (CN); Shie Qian, Irvine, CA (US)

(73) Assignee: DTS LLC, Calabasas, CA (US)

( * ) Notice: Subject to any disclaimer, the term of this patent is extended or adjusted under 35 U.S.C. 154(b) by 751 days.

(21) Appl. No.: 13/547,289

(22) Filed: Jul. 12, 2012

(65) Prior Publication Data

US 2013/0016854 A1 Jan. 17, 2013

Related U.S. Application Data

(60) Provisional application No. 61/507,420, filed on Jul. 13, 2011.

(51) Int. Cl.

*G06F 17/00* (2006.01)
*H04R 3/00* (2006.01)
*H04R 1/40* (2006.01)

(52) U.S. Cl.

CPC ................ *H04R 3/005* (2013.01); *H04R 1/406* (2013.01); *H04S 2400/15* (2013.01)

(58) Field of Classification Search

CPC ..... H04R 3/005; H04R 1/406; H04S 2400/15
USPC .................................... 381/119, 94.7; 700/94
See application file for complete search history.

(56) References Cited

U.S. PATENT DOCUMENTS 5,581,620 A * 12/1996 Brandstein et al. ............ 381/92
7,076,315 B1 7/2006 Watts
7,302,066 B2 11/2007 Balan et al.
7,319,959 B1 1/2008 Watts
7,508,948 B2 3/2009 Klein et al.
8,032,364 B1 10/2011 Watts
8,143,620 B1 3/2012 Malinowski et al.
8,150,065 B2 4/2012 Solbach et al.
8,180,064 B1 5/2012 Avendano et al.
8,189,766 B1 5/2012 Klein (Continued)

FOREIGN PATENT DOCUMENTS

EP 2 237 270 10/2010

OTHER PUBLICATIONS

Ercelebi, "Speech Enhancement Based on the Discrete Gabor Transform and Multi-Notch Adaptive Digital Filters", Applied Acoustics, 65:739-754, Apr. 12, 2004.

(Continued)

*Primary Examiner* — Fan Tsang
*Assistant Examiner* — Eugene Zhao
(74) *Attorney, Agent, or Firm* — Knobbe Martens Olson & Bear LLP

(57) ABSTRACT

An audio system is provided that employs time-frequency analysis and/or synthesis techniques for processing audio obtained from a microphone array. These time-frequency analysis/synthesis techniques can be more robust, provide better spatial resolution, and have less computational complexity than existing adaptive filter implementations. The time-frequency techniques can be implemented for dual microphone arrays or for microphone arrays having more than two microphones. Many different time-frequency techniques may be used in the audio system. As one example, the Gabor transform may be used to analyze time and frequency components of audio signals obtained from the microphone array.

16 Claims, 10 Drawing Sheets

(56) References Cited

U.S. PATENT DOCUMENTS

| | | | | |
|---|---|---|---|---|
| 8,194,880 | B2 | 6/2012 | Avendano | |
| 8,194,882 | B2 | 6/2012 | Every et al. | |
| 2006/0072766 | A1 | 4/2006 | Klein et al. | |
| 2007/0033045 | A1 | 2/2007 | Smaragdis et al. | |
| 2007/0154031 | A1 | 7/2007 | Avendano et al. | |
| 2007/0276656 | A1 | 11/2007 | Solbach et al. | |
| 2008/0019548 | A1 | 1/2008 | Avenado | |
| 2009/0012783 | A1 | 1/2009 | Klein | |
| 2009/0106021 | A1 * | 4/2009 | Zurek et al. | 704/226 |
| 2009/0220107 | A1 | 9/2009 | Every et al. | |
| 2009/0238373 | A1 | 9/2009 | Klein | |
| 2009/0279715 | A1 | 11/2009 | Jeong et al. | |
| 2010/0094643 | A1 | 4/2010 | Avendano et al. | |
| 2010/0145809 | A1 | 6/2010 | Knapp et al. | |
| 2011/0051955 | A1 * | 3/2011 | Cui | H04R 3/005 381/94.1 |
| 2011/0320300 | A1 | 12/2011 | Broms et al. | |
| 2012/0041835 | A1 | 2/2012 | Broms et al. | |
| 2012/0098758 | A1 | 4/2012 | Tull et al. | |
| 2012/0183149 | A1 * | 7/2012 | Hiroe | 381/56 |

OTHER PUBLICATIONS

International Search Report and Written Opinion issued in application No. PCT/US2012/046396 on Sep. 3, 2012.

US 7,979,275, Jul. 2011, Watts. (withdrawn).

Allen, "Advanced Beamforming Concepts: Source Localization Using the Bispectrum, Gabor Transform, Wigner-Ville Distribution, and Nonstationary Signal Representations", Proceedings of the 25$^{th}$ Asilomar Conference on Signal, Systems, and Computers (Nov. 1991).

Microphone Array—Microsoft Research, http://research.microsoft.com/en-us/projects/Microphone_Array/, (Jun. 27, 2011).

Tashev et al., "Microphone Array Support in Windows Longhorn", Microsoft Corporation (2005).

An Introduction to Wavelets, JSL (Sep. 1, 2006).

Qian, "Discrete Gabor Transform", IEEE Transactions on Signal Processing, 41(7):2429-2438 (Jul. 1993).

Qian, *Introduction to Time-Frequency and Wavelet Transforms,* Chapter 3: Short-Time Fourier Transform and Gabor Expansion, 2001.

D. Gabor, "Theory of communication," J. IEE, vol. 93, No. III, pp. 429-457, London, Nov. 1944.

M.J. Bastiaans, "Gabor's expansion of a signal into Gaussian elementary signals," Proceedings of the IEEE, vol. 68, pp. 538-539, Apr. 1980.

J. Wexler and S. Raz, "Discrete Gabor expansions," Signal Processing, vol. 21, No. 3, pp. 207-221, Nov. 1990.

* cited by examiner

900

MICROPHONE ARRAY PROCESSING SYSTEM

RELATED APPLICATION

This application claims priority under 35 U.S.C. §119(e) to U.S. Provisional Application No. 61/507,420 filed Jul. 13, 2011, entitled "Multi-Microphone Array Processing," the disclosure of which is hereby incorporated by reference in its entirety.

BACKGROUND

Personal computers and other computing devices usually play sounds with adequate sound quality but do a poor job at recording audio. With today's processing power, storage capacities, broadband connections, and speech recognition engines of the computing world, there is an opportunity for computing devices to use sounds to deliver more value to users. Computer systems can provide better live communication, voice recording, and user interfaces than phones.

However, most computing devices continue to use the traditional recording paradigm of a single microphone. A single microphone, however, does not accurately record audio because the microphone tends to pick up too much ambient noise and adds too much electronic noise. Generally speaking, single microphone based noise reduction algorithms are only effective for stationary environment noise suppression. They are not suitable for non-stationary noise reduction, such as background talking in a busy street, subway station, or cocktail party. Thus, users who desire better recording quality commonly resort to expensive tethered headsets.

SUMMARY

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

In certain embodiments, a method of reducing noise using a plurality of microphones includes receiving a first audio signal from a first microphone in a microphone array and receiving a second audio signal from a second microphone in the microphone array. One or both of the first and second audio signals can include voice audio. The method can further include applying a Gabor transform to the first audio signal to produce first Gabor coefficients with respect to a set of frequency bins, applying the Gabor transform to the second audio signal to produce second Gabor coefficients with respect to the set of frequency bins, and computing, for each of the frequency bins, a difference in phase, magnitude, or both phase and magnitude between the first and second Gabor coefficients. In addition, the method can include determining, for each of the frequency bins, whether the difference meets a threshold. The method may also include, for each of the frequency bins in which the difference meets the threshold, assigning a first weight, and for each of the frequency bins in which the difference does not meet the threshold, assigning a second weight. Moreover, the method can include forming an audio beam by at least (1) combining the first and second Gabor coefficients to produce combined Gabor coefficients and (2) applying the first and second weights to the combined Gabor coefficients to produce overall Gabor coefficients, and applying an inverse Gabor transform to the overall Gabor coefficients to obtain an output audio signal. In certain embodiments, the combining of the first and second Gabor coefficients and the applying of the first and second weights to the combined Gabor coefficients causes the output audio signal to have less noise than the first and second audio signals.

In certain embodiments, the method of the preceding paragraph includes any combination of the following features: where said computing the difference includes computing the difference in phase when the first and second microphones are configured in a broadside array; where said computing the difference includes computing the difference in magnitude when the first and second microphones are configured in an end-fire array; where said forming the audio beam includes adaptively combining the first and second Gabor coefficients based at least partly on the assigned first and second weights; and/or further including smoothing the first and second weights with respect to both time and frequency prior to applying the first and second weights to the combined Gabor coefficients.

A system for reducing noise using a plurality of microphones in various embodiments includes a transform component that can apply a time-frequency transform to a first microphone signal to produce a first transformed audio signal and to apply the time-frequency transform to a second microphone signal to produce a second transformed audio signal. The system can also include an analysis component that can compare differences in one or both of phase and magnitude between the first and second transformed audio signals and that can calculate noise filter parameters based at least in part on the differences. Further, the system can include a signal combiner that can combine the first and second transformed audio signals to produce a combined transformed audio signal, as well as a time-frequency noise filter implemented in one or more processors that can filter the combined transformed audio signal based at least partly on the noise filter parameters to produce an overall transformed audio signal. Moreover, the system can include an inverse transform component that can apply an inverse transform to the overall transformed audio signal to obtain an output audio signal.

In certain embodiments, the system of the preceding paragraph includes any combination of the following features: where the analysis component can calculate the noise filter parameters to enable the noise filter to attenuate portions of the combined transformed audio signal based on the differences in phase, such that the noise filter applies more attenuation for relatively larger differences in the phase and less attenuation for relatively smaller differences in the phase; where the analysis component can calculate the noise filter parameters to enable the noise filter to attenuate portions of the combined transformed audio signal based on the differences in magnitude, such that the noise filter applies less attenuation for relatively larger differences in the magnitude and more attenuation for relatively smaller differences in the magnitude; where the analysis component can compare the differences in magnitude between the first and second transformed audio signals by computing a ratio of the first and second transformed audio signals; where the analysis component can compare the differences in phase between the first and second transformed audio signals by computing an argument of a combination of the first and second transformed audio signals; where the signal combiner can combine the first and second transformed audio signals adaptively based at least partly on the differences identified by the analysis component; and/or where the analysis component can smooth the noise filter in one or both of time and frequency.

In some embodiments, non-transitory physical computer storage configured to store instructions that, when implemented by one or more processors, cause the one or more processors to implement operations for reducing noise using a plurality of microphones. The operations can include receiving a first audio signal from a first microphone positioned at an electronic device, receiving a second audio signal from a second microphone positioned at the electronic device, transforming the first audio signal into a first transformed audio signal, transforming the second audio signal into a second transformed audio signal, comparing a difference between the first and second transformed audio signal; constructing a noise filter based at least in part on the difference, and applying the noise filter to the transformed audio signals to produce noise-filtered audio signals.

In certain embodiments, the operations of the preceding paragraph include any combination of the following features: where the operations further include smoothing parameters of the noise filter prior to applying the noise filter to the transformed audio signals; where the operations further include applying an inverse transform to the noise-filtered audio signals to obtain one or more output audio signals; where the operations further include combining the noise-filtered audio signals to produce an overall filtered audio signal; and where the operations further include applying an inverse transform to the overall filtered audio signal to obtain an output audio signal.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION

I. Introduction

An alternative to the single microphone setup is to provide a microphone array of two or more microphones, which may (but need not) be closely spaced together. Having the sound signal captured from multiple microphones allows, with proper processing, for spatial filtering called beamforming. In beamforming applications, the microphones and associated processor(s) may pass through or amplify a signal coming from a specific direction or directions (e.g., the beam), while attenuating signals from other directions. Beamforming can therefore reduce ambient noises, reduce reverberations, and/or reduce the effects of electronic noise, resulting in a better signal-to-noise ratio and a dryer sound. Beamforming can be used to improve speech recognition, Voice-over-IP (VoIP) call quality, and audio quality in other recording applications.

One drawback to currently-available beamforming techniques is that such techniques typically involve adaptive filters. Adaptive filters can typically have significant computational complexity. Adaptive filters can also be sensitive to quantization noise and may therefore be less robust than desired. Further, adaptive filters may have poor spatial resolution, resulting in less accurate results than may be desired for a given application.

Advantageously, in certain embodiments, an audio system is provided that employs time-frequency analysis and/or synthesis techniques for processing audio obtained from a microphone array. These time-frequency analysis/synthesis techniques can be more robust, provide better spatial resolution, and have less computational complexity than existing adaptive filter implementations. The time-frequency techniques can be implemented for dual microphone arrays or for microphone arrays having more than two microphones.

II. Beamforming Overview

Figure 1:
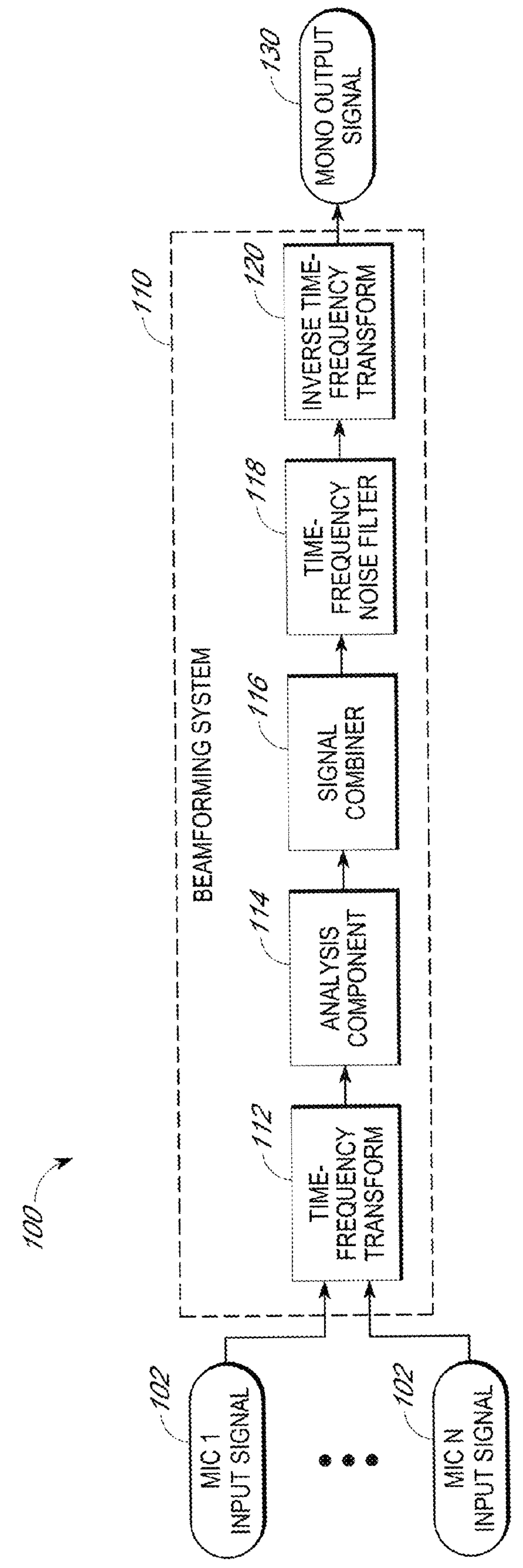
FIG. 1 illustrates an embodiment of an audio system that can perform efficient audio beamforming.

FIG. 1 illustrates an embodiment of an audio system 100 that can perform efficient audio beamforming. The audio system 100 may be implemented in any machine that receives audio from two or more microphones, such as various computing devices (e.g., laptops, desktops, tablets, etc.), mobile phones, dictaphones, conference phones, videoconferencing equipment, recording studio systems, and the like. Advantageously, in certain embodiments, the audio system 100 can selectively reduce noise in received audio signals more efficiently than existing audio systems. One example application for the audio system 100 is voice calling, including calls made using cell coverage or Internet technologies such as Voice over IP (VoIP). However, the audio system 100 can be used for audio applications other than voice processing.

Voice calls commonly suffer from low quality due to excess noise. Mobile phones, for instance, are often used in areas that include high background noise. This noise is often of such a level that intelligibility of the spoken communication from the mobile phone speaker is greatly degraded. In many cases, some communication is lost or at least partly lost because high ambient noise level masks or distorts a caller's voice, as it is heard by the listener.

It has been found that by applying multiple microphones one can effectively enhance voice from a desired direction and in the meantime suppress stationary as well as non-stationary signals from some or all other directions. Over the years, many multi-microphone based noise reduction techniques have been proposed. Compared to those known methods, the approach introduced herein can be more robust and can have less computational cost. One basic idea of this approach is that, in certain embodiments, at any given time instant t, the frequency component c(t, f) may be dominated by either desired voice or unwanted noise. Whether c(t, f) is a part of desired voice or unwanted noise can be examined by the direction of arrival or a comparison of signals acquired by primary and auxiliary microphones. The audio system 100 can therefore use time-frequency techniques to emphasize voice components of an audio signal and reject or otherwise attenuate noise components of the audio signal.

In the depicted embodiment, the audio system 100 includes a beamforming system 110 that receives multiple microphone input signals 102 and outputs a mono output signal 130. The beamforming system 110 can process any number of microphone input signals 102. For convenience, the remainder of this specification will refer primarily to dual microphone embodiments. However, it should be understood that the features described herein can be readily extended to more than two microphones. In some embodiments, using more than two microphones to perform beamforming can advantageously increase the directivity and noise rejection properties of the beamforming system 110. Yet two microphone audio systems 100 can still provide improved noise rejection over a single microphone system while also achieving more efficient processing and lower cost over three or more microphone systems.

The example beamforming system 110 shown includes a time-frequency transform component 112, an analysis component 114, a signal combiner 116, a time-frequency noise filter 118, and an inverse time-frequency transform component 120. Each of these components can be implemented in hardware and/or software. By way of overview, the time-frequency transform component 112 can apply a time-frequency transform to the microphone input signals 102 to transform these signals into time-frequency sub-components. Many different time-frequency techniques may be used by the time-frequency transform component 112. Some examples include the Gabor transform, the short-time Fourier transform, wavelet transforms, and the chirplet transform. This specification refers describes example implementations using the Gabor transform for illustrative purposes, although any of the above or other appropriate transforms may readily be used instead of or in addition to the Gabor transform.

The time-frequency component 112 supplies transformed microphone signals to the analysis component 114. The analysis component 114 compares the transformed microphone signals to determine differences between the signals. This difference information can indicate whether a signal includes primarily voice or noise, or some combination of both. In one embodiment, the analysis component 114 assumes that audio in the straight-ahead direction from the perspective of a microphone array is likely a voice signal, while audio in directions other than straight ahead likely represents noise. More detailed examples of such analysis are described below.

Using the identified difference information, the analysis component 114 can construct a noise filter (118) or otherwise provide parameters for the noise filter (118) that indicate which portions of the time-frequency information are to be attenuated. The analysis component 114 may also smooth the parameters of the noise filter 118 in time and/or frequency domains to attempt to reduce voice quality loss and musical noise. The analysis component 114 can also provide the parameters related to the noise filter 118 to the signal combiner 116 in some embodiments.

The signal combiner 116 can combine the transformed microphone signals in the time-frequency domain. By combining the signals, the signal combiner 116 can act at least in part as a beamformer. In an embodiment, the signal combiner 116 combines the transformed microphone signals into a combined transformed audio signal using either fixed or adaptive beamforming techniques. For the fixed case selecting a beam in front of the microphones, for example, the signal combiner 116 can sum the two transformed microphone signals and divide the two transformed microphone signals by two. More generally, the signal combiner 116 can sum N input signals (N being an integer) and divide the summed input signals by N. The resulting combined transformed audio signal may have less noise by virtue of the combination of the signals.

If two microphones are facing a user, for instance, the two microphones may pick up the user's voice roughly equally. Combining signals from the two microphones may tend to roughly double the user's voice in the resulting combined signal prior to halving. In contrast, ambient noise picked up by the two microphones may tend to cancel out or otherwise attenuate at least somewhat when combined due to the random nature of ambient noise (e.g., if the noise is additive white Gaussian noise (AWGN)). Other forms of noise, however, such as some periodic noises or colored noise, may attenuate less than ambient noise in the beamforming process.

The signal combiner 116 can also combine the transformed microphone signals adaptively based on the parameters received from the analysis component 114. Such adaptive beamforming can advantageously take into account variations in microphone quality. Many microphones used in computing devices and mobile phones, for instance, are inexpensive and therefore not tuned precisely the same. Thus, the frequency response and sensitivity of each microphone may differ by several dB. Adjusting the beam adaptively can take into account these differences programmatically, as will be described in greater detail below.

The time-frequency noise filter 118 can receive the combined transformed audio signal from the signal combiner 116 and apply noise filtering to the signal based on the parameters received from the analysis component 114. The noise filter 118 can therefore advantageously attenuate noise coming from certain undesired directions and therefore improve voice signal quality (or other signal quality). The time-frequency noise filter 118 therefore can also act as a beamformer. Thus, the signal combiner 116 and time-frequency noise filter 118 can act together to form an audio beam that selectively emphasizes desired signal while attenuating undesired signal. In one embodiment, the time-frequency noise filter 116 can be used in place of the signal combiner 116, or vice versa. Thus, either signal combining or time-frequency noise filtering can be implemented by the beamforming system 110, or both.

The output of the time-frequency noise filter 118 is provided to the inverse time-frequency transform component 120, which transforms the output into a time domain signal. This time domain signal is output by the beamforming system 110 as the mono output signal 130. The mono output signal 130 may be transmitted over a network to a receiving mobile phone or computing device or may be stored in memory or other physical computer storage. The phone or computing device that receives the mono output signal 130 can play the signal 130 over one or more loudspeakers. In one embodiment, the receiving phone or computing device can apply a mono-to-stereo conversion to the signal 130 to create a stereo signal from the mono output signal 130. For example, the receiving device can implement the mono-to-stereo conversion features described in U.S. Pat. No. 6,590,983, filed Oct. 13, 1998, titled "Apparatus and Method for Synthesizing Pseudo-Stereophonic Outputs from a Monophonic Input," the disclosure of which is hereby incorporated by reference in its entirety.

Although a mono output signal 130 is shown, in some embodiments the beamforming system 110 provides multiple output signals. For instance, as described above, the signal combiner 116 component may be omitted, and the time-frequency noise filter 118 can be applied to the multiple transformed microphone signals instead of a combined transformed signal. The inverse time-frequency transform component 120 can transform the multiple signals to the time domain and output the multiple signals. The multiple signals can be considered separate channels of audio in some embodiments.

Figure 2:
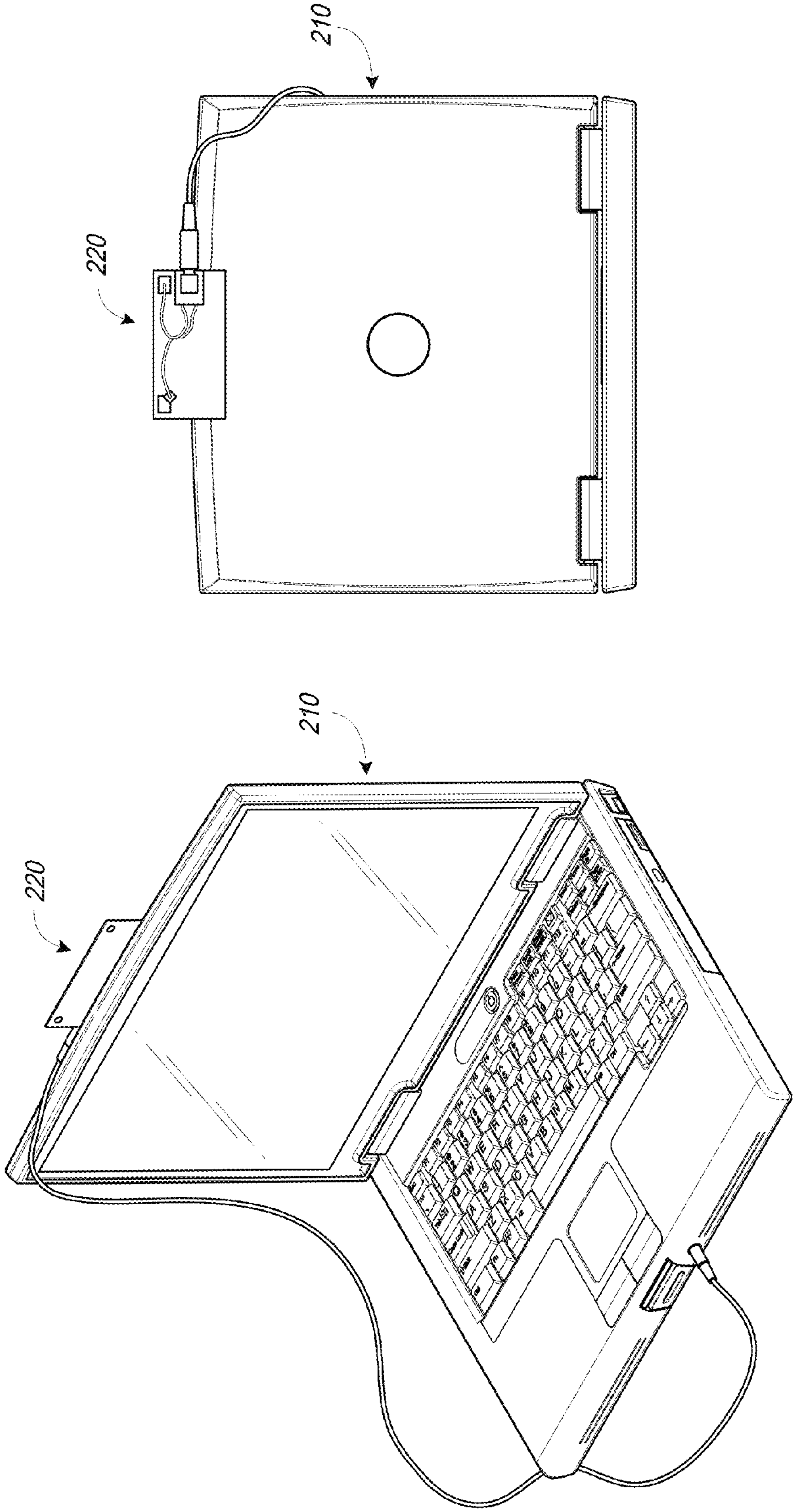
FIG. 2 illustrates an example broadside microphone array positioned on a laptop computer.
Figure 3:
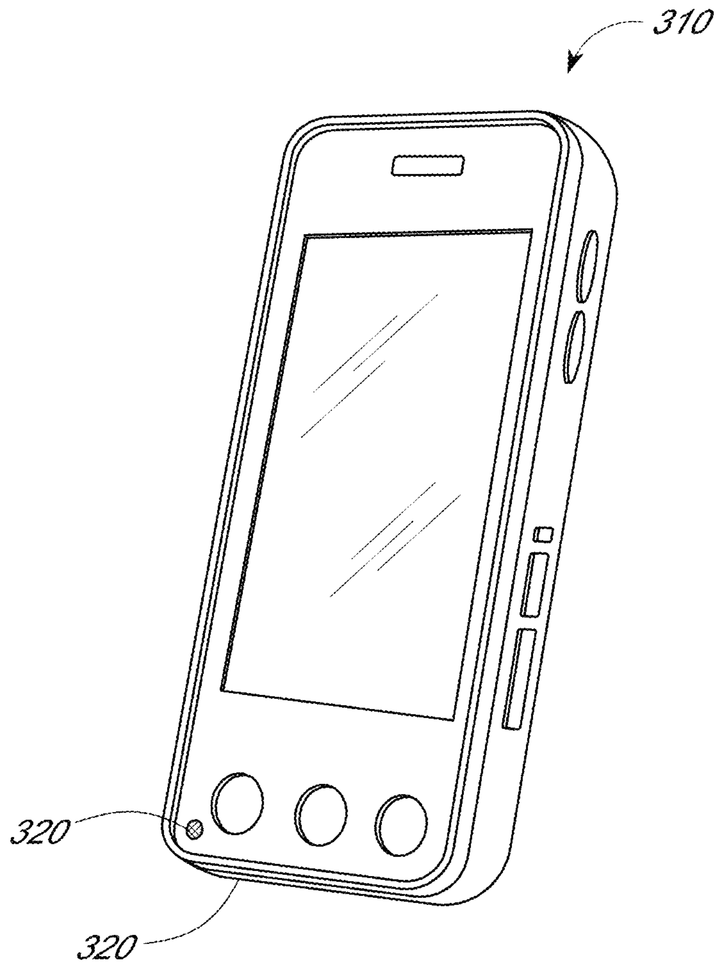
FIG. 3 illustrates an example end-fire microphone array in a mobile phone.

FIGS. 2 and 3 illustrate some of the different types of microphone arrays that can be used with the beamforming system 110 of FIG. 1. In particular, FIG. 2 illustrates an example broadside microphone array 220 positioned at a laptop computer 210, and FIG. 3 illustrates an example end-fire microphone array 320 in a mobile phone 310.

In the broadside microphone array 220 of FIG. 2, two microphones can be on the same side. If the person speaking is in directly front of the laptop 210, then his or her voice should arrive in the two microphones in the array 220 simultaneously or substantially simultaneously. In contrast, sound coming from either side of the laptop 210 can arrive at one of the microphones sooner than the other microphone, resulting in a time delay between the two microphones. The beamforming system 110 can therefore determine the nature of a signal's sub-component for the broadside microphone array 220 by comparing the phase difference of the signals received by the two microphones in the array 220. Time-frequency subcomponents that have a sufficient phase difference may be considered noise to be attenuated, while other subcomponents with low phase difference may be considered desirable voice signal.

In the end-fire microphone array 320 of FIG. 3, microphones can be located in the front and back of the mobile phone 310. The microphone in the front of the phone 310 can be considered a primary microphone, which may be dominated by a user's voice. The microphone on the back side of the mobile phone 310 can be considered an auxiliary microphone, which may be dominated by background noise. The beamforming system 110 can compare the magnitude of the front microphone signal and the rear microphone signal to determine which time-frequency subcomponents correspond to voice or noise. Subcomponents with a larger front signal magnitude likely represent a desired voice signal, while subcomponents with a larger rear signal magnitude likely represent noise to be attenuated.

The microphone arrays 220, 320 of FIGS. 2 and 3 are just a few examples of many types of microphone arrays that are compatible with the beamforming system 110. In general, a microphone array usable with the beamforming system 110 may be built-in to a computing device or may be provided as an add-on component to a computing device. In addition, although not shown, other computing devices may have a combination of broadside and end-fire microphone arrays. Some mobile phones, for instance, may have three, four, or more microphones located in various locations on the front and/or back. The beamforming system 110 can combine the processing techniques described below for broadside and end-fire microphones in such cases.

III. Example Time-Frequency Transform

As described above, the time-frequency transform 112 can use any of a variety of time-frequency transforms to transform the microphone input signals into the time-frequency domain. One such transform, the Gabor transform, will be described in detail herein. Other transforms can be used in place of the Gabor transform in other embodiments.

The Gabor transform or expansion is a mathematical tool that can decompose an incoming time waveform s(t) into corresponding time-frequency sub-components c(t, f). According to Gabor theory, a time waveform s(t) can be represented as a superposition of corresponding time-frequency sub-components $c_{m,n}$, sampled in continuous time and frequency c(t, f). For example, $$s(t)=\Sigma\Sigma c_{m,n}h_{m,n}(t) \quad (1)$$

where m and n denote time and frequency sampling indices, respectively. Therefore, t=mT and f=nΩ, wherein m and n are integers, T represents time, and Ω represents frequency. The coefficients $c_{m,n}$ are also called Gabor coefficients. The function $h_{m,n}(t)$ can be an elementary function and may be concentrated in both the time and frequency domain.

Figure 4:
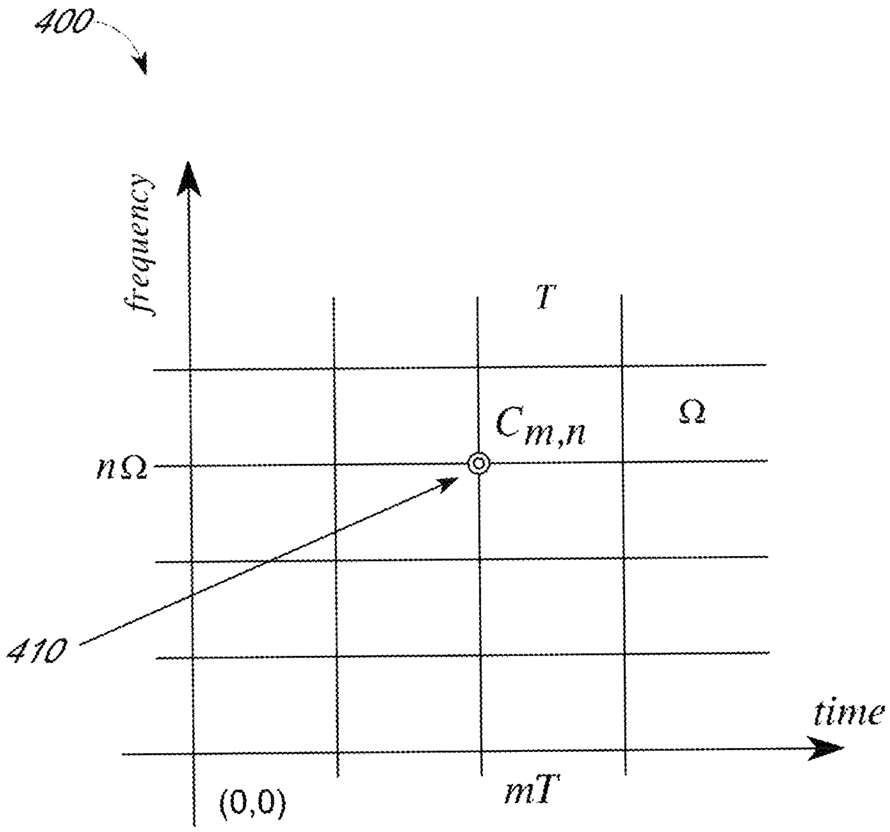
FIG. 4 illustrates an example graph of a time-frequency representation of a signal.

The Gabor transform can be visualized by the example graph 400 shown in FIG. 4, which illustrates a time-frequency Gabor representation of a signal. A coefficient $c_{m,n}$ at point 410 on the graph 400 represents an intersection between time and frequency axes. The Gabor transform produces a frequency spectrum for each sample point in time mT.

The discrete Gabor expansion of a discrete data sample s[k] can be written as $$s[k]=\sum_{m=0}\sum_{n=0}^{N-1}c_{m,n}h[k-mT]e^{\frac{j2\pi mn}{N}}=\sum_{m=0}h[k-mT]\sum_{n=0}^{N-1}c_{m,n}e^{\frac{j2\pi mn}{N}} \quad (2)$$

where h[k] denotes an L-point synthesis window. N denotes a number of sampling points in the frequency domain, such that N=L/Ω. The discrete Gabor coefficients $c_{m,n}$ can be computed by $$c_{m,n}=\sum_{k=-(L-T)}^{\infty}s[k]\gamma^*[k-mT]e^{\frac{-j2\pi kn\Omega}{L}}=\sum_{k=-(L-T)}^{\infty}s[k]\gamma^*[k-mT]e^{\frac{-j2\pi kn}{N}} \quad (3)$$

where γ[k] denotes an L-point analysis window. To ensure that the discrete Gabor expansion is accurate, the L-point analysis window γ[k] and L-point synthesis window h[k] should satisfy certain conditions in certain embodiments, described in reference [4], listed below.

Let k=xN+I, where 0≤i<N; then equation (3) can be rewritten as:

$$c_{m,n}=\sum_{x}\sum_{i=0}^{N-1}s[xN+i]\gamma^*[xN+i-mT]e^{-\frac{j2\pi in}{N}} \quad (4)$$

Consequently, an N-point fast-Fourier transform (FFT) can be used to compute the original L-point Gabor transform. The above formula (eqn (4)) can be equivalent to a windowed FFT, where the overlap is determined by $$\text{overlap}=\frac{L-T}{T} \quad (5)$$

In some embodiments, T=0.5*L, or 50% overlap. However, other values for the overlap may be chosen in different embodiments. Usually, the L-point analysis window γ[k] is selected first. Then the corresponding L-point synthesis window h[k] can be computed according to the so-called orthogonal-like relationship presented in reference [4], listed below.

Figure 5:
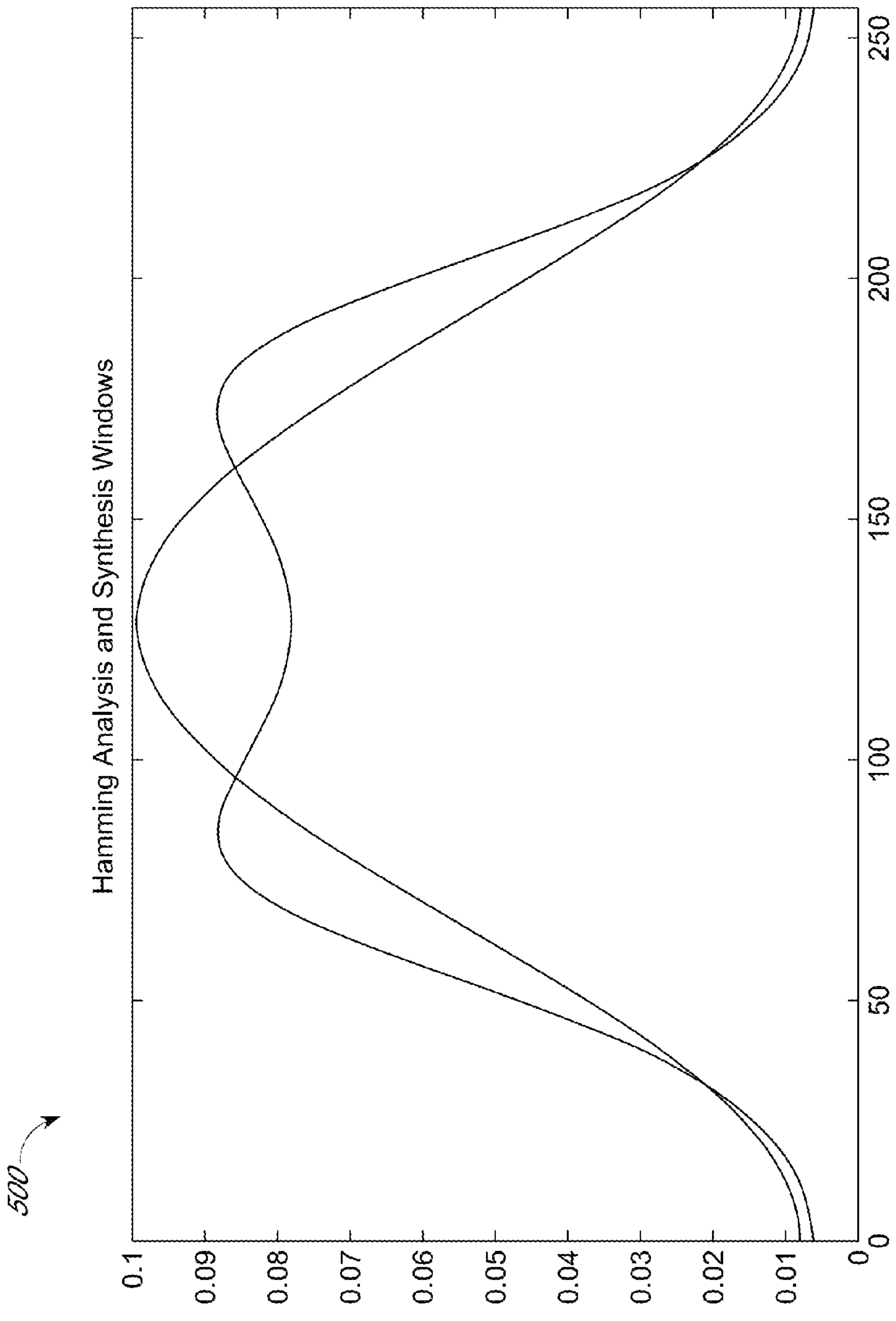
FIG. 5 illustrates a graph of example window functions that can be used to construct a time-frequency representation of a signal.

FIG. 5 illustrates a graph 500 of example window functions that can be used to construct a time-frequency representation of a signal. The graph 500 illustrates an example 256-point Hamming analysis (512) and synthesis (514) windows. In this example, Ω=1, so that N=L. The time sampling interval T=N/2. Other windows may be used in other embodiments.

IV. Example Beamforming Process

Figure 6:
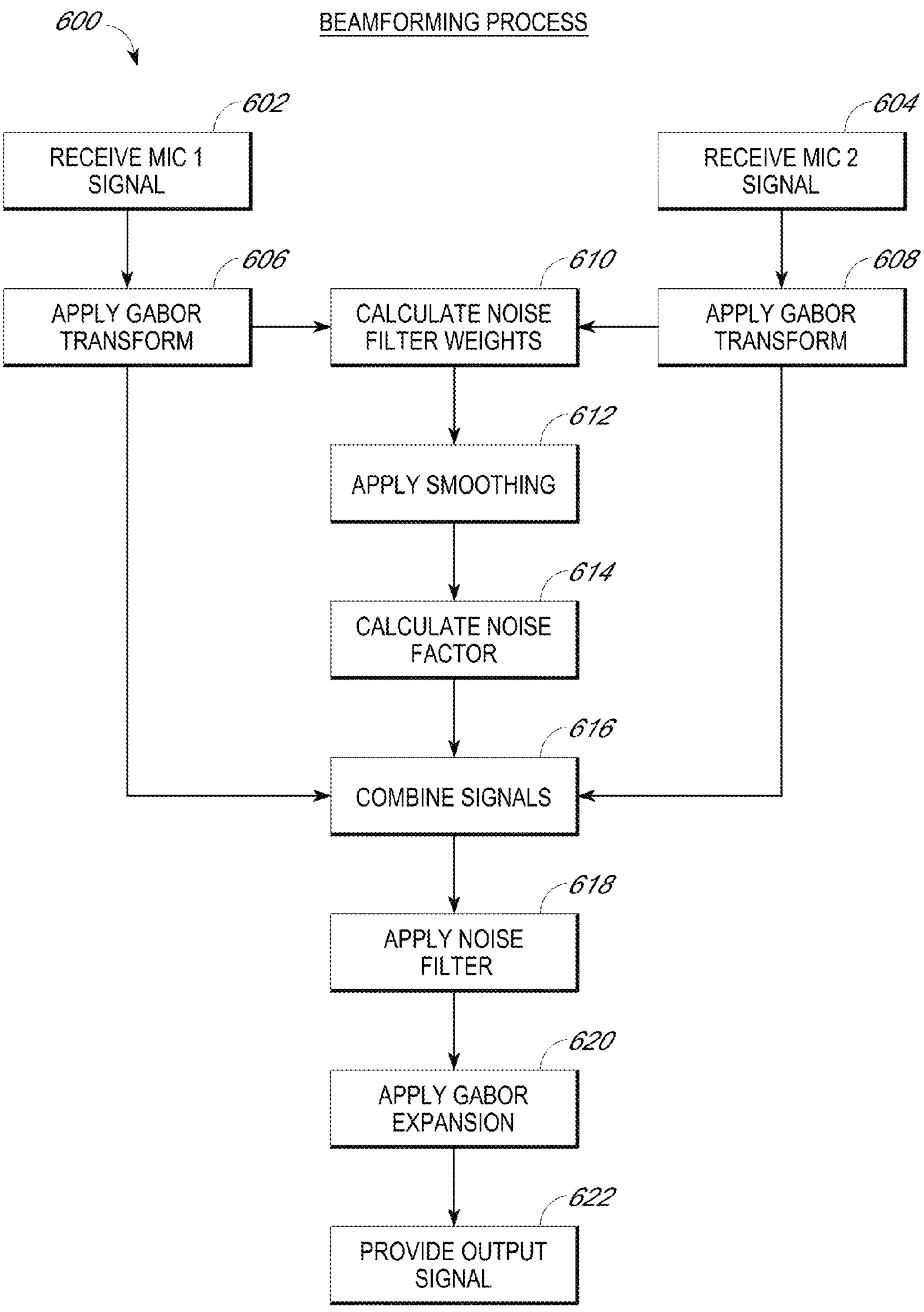
FIG. 6 illustrates an embodiment of a beamforming process.

FIG. 6 illustrates an embodiment of a beamforming process 600. The beamforming process 600 may be implemented by the beamforming system 110 of FIG. 1. More generally, the beamforming process 600 may be implemented by any hardware and/or software, such as one or more processors specifically programmed to implement the beamforming process 600. For convenience, the process 600 is described with respect to two microphones, although the process 600 may be extended to process more than two microphone input signals.

The process 600 begins at blocks 602 and 604, where two microphone signals are received. The microphone signals may be from a broadside array, an end-fire array, or a combination of the two. At blocks 606 and 608, the time-frequency transform component 112 applies the Gabor transform (or another transform) to each of the input signals. For example, at the time instant t=mT, discrete Gabor coefficients $c1_{m,n}$ and $c2_{m,n}$ of the signals received by the two microphones can be computed. For an end-fire dual microphone array, $c1_{m,n}$ and $c2_{m,n}$, can represent discrete Gabor coefficients of signals received by primary and auxiliary microphones, respectively. In some embodiments, the FFT applied in the Gabor transform process has the same length as the window described above, such that N=L. Because $c_{m,n}=c^*_{m,N-n}$, for 0<n<N/2, at any time instant t=mT, in certain embodiments, the time-frequency transform component 112 modifies 1+N/2 discrete Gabor coefficients.

The process 600 also constructs a noise filter in blocks 610 through 614. Application of this filter will be described with respect to block 618 below. Referring to block 610, the analysis component 114 computes noise filter weights. These noise filter weights are examples of parameters that may be calculated for the time-frequency noise filter 118. In one embodiment, the analysis component 114 computes the weights by first comparing differences between aspects of the two transformed microphone signals. For example, the analysis component 114 can compute a phase difference and ratio of magnitude of $c1_{m,n}$ and $c2_{m,n}$ for example, as follows:

$$r_{phase}(n) = \frac{1}{2\pi f}\arg(c1_{m,n}c2^*_{m,n}) \tag{6}$$

$$r_{mag}(n) = \frac{|c1_{m,n}|}{|c2_{m,n}|}$$

for $$0 \le n < \frac{N}{2}.$$

As described above, phase difference information can be used to identify noise from desired signal in a broadside array, while magnitude difference information may be used to identify noise from desired signal in an end-fire array. The $r_{phase}$ component of eqns. (6) represents one way to calculate this phase difference information, while the $r_{mag}$ component of eqns. (6) represents one way to calculate this magnitude difference information. One or both of equations (6) can be calculated for each time-frequency subcomponent of the transformed audio signals. For each sampled time, the time-frequency subcomponents can include a plurality of frequency bins as a result of FFT processing. For convenience, this specification often refers to the time-frequency subcomponents and frequency bins interchangeably.

For a broadside microphone array, the analysis component 114 can compute the weighting factor for each time-frequency subcomponent or bin in certain embodiments by the following:

$$w_b(n) = \begin{cases} 0 & \delta_b(n) > 1 \\ \delta_b(n) & 0 \le \delta_b(n) \le 1 \\ 1 & \delta_b(n) < 0 \end{cases} \tag{7}$$

where $$\delta_b(n) = \beta_b(r_{phase}(n) - \alpha_b) \tag{8}$$

and where $\alpha_b$ and $\beta_b$ are a phase threshold and scale factor, respectively. The phase threshold $\alpha_b$ can control the orientation of the resulting acoustic beam. In the broadside microphone configuration, the value of the phase threshold $\alpha_b$ can be 0 or some small value that compensates for phase differences in the microphone array. The scale factor $\beta_b$ can control the width of the acoustic beam.

Thus, for example, if the coefficients $c1_{m,n}$ and $c2_{m,n}$ are close in phase, indicating that the signals are coming from in front of the microphones and are therefore likely not noise, the value of $\delta_b$(n) may be less than zero. The weighting can therefore be 1, which can allow the signal to be passed with little or no attenuation (see block 614). In contrast, if the coefficients are significantly out of phase, reflecting that the sound source is likely not coming from directly in front of the microphones and is therefore likely noise, the value of $\delta_b$(n) may be more than 1. As a result, the weighting can be set to 0. When this weighting is applied to the signal (block 614), the noise can therefore be attenuated.

Between situations where the coefficients are close in phase or substantially out of phase, the value $\delta_b$(n) can be assigned to the weighting so as to at least partially attenuate the signal. The value $\delta_b$(n) can therefore act as a tolerance factor that passes some but perhaps not all of a signal that is out of phase when the noise filter is applied. The tolerance factor can therefore allow useful signal to pass through when a speaker is positioned slightly away from directly centered on the microphone array. However, in other embodiments, the weighting is assigned a binary 1 or 0 value based on the value of $\delta_b$(n) and is not assigned the value of $\delta_b$(n).

For end-fire dual microphones, the analysis component 114 can compute the weighting factor for each time-frequency subcomponent or bin in certain embodiments by the following:

$$w_e(n) = \begin{cases} 1 & \delta_e(n) > 1 \\ \delta_e(n) & 0 \le \delta_e(n) \le 1 \\ 0 & \delta_e(n) < 0 \end{cases} \tag{9}$$

where $$\delta_e(n) = \beta_e(r_{mag}(n) - \alpha_e) \tag{10}$$

and where $\alpha_e$ and $\beta_e$ are a magnitude threshold and scale factor, respectively. In the enfire configuration, $\alpha_e$ and $\beta_e$ can be used to control the width of the acoustic beam. Also, the threshold factor $\alpha_e$ can be used to compensate for phase differences in the microphone array.

Sounds that predominate the front microphone and therefore result in a higher $r_{mag}$ can result in a weighting of 1, whereas sounds that predominate the rear microphone and therefore result in a lower $r_{mag}$ can result in a weighting of 0. For sounds with $\delta_e(n)$ in between 0 and 1, the weight can be equal to $\delta_e(n)$. The value $\delta_e(n)$ can be a tolerance factor that passes some but not all of the signal when the noise filter is applied. The weighting factor can be applied to the signal similarly as with the broadside microphone array example (see block 614).

For devices that include both broadside and end-fire microphone arrays, the analysis component 110 can combine the two weighting factors from equations (7) and (9) as follows:

$$w(n)=w_b(n)w_e(n) \tag{11}$$

Although a scale of [0, 1] for the weighting factors is described herein, other scales may also be used.

In some embodiments, calculating the noise filter weights at block 610 goes a step further to include smoothing of the weights. Dramatic variations of the weighting factor in adjacent frequency bins can cause musical noise. To avoid these musical noise artifacts, the analysis component 114 may apply a smoothing process at block 612 such as the following smoothing process to w(n) in the time-frequency domain:

$$\vartheta_n = \varepsilon\frac{2}{N}\sum_{n=0}^{N/2} |\hat{c}_{m,n}|^2 + (1-\varepsilon)|\hat{c}_{m,n}|^2 \tag{12}$$

$$\varphi_n = 0.1\frac{|\hat{c}_{m,n}|^2}{\vartheta_n} \tag{13}$$

$$w_s(n) = (1-\varphi_n)\frac{2}{N}\sum_{n=0}^{N/2} |w(n)|^2 + \varphi_n w(n) \tag{14}$$

where $\epsilon$ is a smoothing factor that can have a range, for example, of [0, 1]. Smoothing can also beneficially reduce voice quality loss that may result from noise filtering. Further, although smoothing in both time and frequency are illustrated by equations (12) through (14), smoothing may be done instead in either the time or frequency domain. Other algorithms can also be used to perform smoothing.

To reduce residual noise, in some embodiments the analysis component 114 reduces the smoothed weighting factor by a residual noise factor at block 614. Calculation of this residual noise factor $\rho_n$ at block 614 may be determined by the following:

$$\rho_n = \begin{cases} 0.1, & \sum_{n=0}^{N/2} |\hat{c}_{m,n} w_s(n)|^2 < 0.5\sum_{n=0}^{N/2} |\hat{c}_{m,n}|^2 \text{ and } \sum_{n=0}^{N/2} |\hat{c}_{m,n}|^2 < \varepsilon \\ 1, & \text{otherwise} \end{cases} \tag{15}$$

where $\epsilon$ is a smoothing factor that can have a range, for example, of [0, 1]. In one embodiment, an option is exposed for a user to manually select whether to apply this residual noise factor. In devices having a graphical user interface, for instance, the analysis component 114 can output a button or other user interface control that enables the user to select more aggressive noise filtering. Upon user selection of this control, the residual noise factor can be applied (see block 618). A hardware button could also be implemented in a device embodying the beamforming system 110 to accomplish the same effect.

In some cases, this residual noise factor may deteriorate voice quality. However, a user may wish to apply the residual noise factor in very noisy environments regardless of voice quality loss. The potential voice quality loss due to application of the residual noise factor may be offset by the benefit of reduced noise in some noisy environments.

With continued reference to FIG. 6, at block 616, the Gabor-transformed microphone signals are combined to produce a single transformed signal. In certain embodiments, the Gabor coefficients, $c1_{m,n}$ and $c2_{m,n}$, are combined by an adaptive filter, e.g., $$\hat{c}_{m,n}=d1_{m,n}c1_{m,n}+d2_{m,n}c2_{m,n} \tag{16}$$

The coefficients $d1_{m,n}$ and $d2_{m,n}$ can be fixed to form a fixed beamformer or adapted to the changes of microphone inputs. In situations where these values are fixed, it can be said that an adaptive filter is not used. For example, the coefficients can be fixed as $d1_{m,n}=d2_{m,n}=0.5$ for the case where the person speaking is directly in front of the microphones. With these coefficients valued at 0.5, equation (16) essentially sums the coefficients and divides by two. As discussed above with respect to FIG. 1, this fixed combining arrangement can increase signal-to-noise ratio (SNR) by constructively combining the desired signal (e.g., voice) from each microphone input channel while destructively combining random noise from each microphone input channel. Further, other fixed values for the coefficients $d1_{m,n}$ and $d2_{m,n}$ may be chosen for other applications that may, for instance, include selecting a direction other than directly in front of the microphones. The Additional Embodiments section below describes one example application for changing the direction of these coefficients.

The coefficients can be adapted using (for example) minimum variance output criteria, such as the following:

$$d1_{m,n} = d1_{m-1,n} + \mu\frac{\hat{c}^*_{m,n}(c2_{m,n} - c1_{m,n})}{|\hat{c}_{m,n}|^2} \tag{17}$$

$$d2_{m,n} = d2_{m-1,n} + \mu\frac{\hat{c}^*_{m,n}(c1_{m,n} - c2_{m,n})}{|\hat{c}_{m,n}|^2} \tag{18}$$

In this case, $\mu$ is an adapting step that may be controlled by the results of the noise filter construction process. For example, $\mu$ may be defined as follows:

$$\mu = \begin{cases} \mu_0, & w(n) = 1 \\ 0, & w(n) < 1 \end{cases} \tag{19}$$

where $\mu_0=0.1$ or another constant.

Adapting of the coefficients can include dynamically updating the coefficients to account for variations in the transformed microphone signals. As described above, inexpensive microphones used in many electronic devices are not precisely calibrated to one another. To more accurately form an acoustic beam that selects a desired signal such as voice, the acoustic beam can be adapted to emphasize coefficients from one microphone over the other (albeit possibly slightly) using a process such as that outlined in equations (16) through (19) above. Thus, a phase mismatch of up to 10 degrees (or possibly more) can be adaptively adjusted with the filter of equations (16) through (19) or the like, without calibrating the microphones.

Although described herein as an adaptive filter, the filter described by equations (16) through (19) is not based on a Wiener filter or stochastic processing in certain embodiments and is less processing intensive than some or all Wiener-filter based or stochastic processing-based adaptive filters.

At block 618, the noise filter constructed above with respect to blocks 610 through 614 is applied to the combined signal output at block 616. For example, in one embodiment, the noise filter can be applied by updating each time-frequency sub-component at time instant t=mT as follows:

$$c_{m,n}=\rho_n w_s(n)\hat{c}_{m,n},\ \text{for } 0\le n<N/2 \qquad (20)$$

where $w_s(n)$ represent the smoothed weights calculated at blocks 610 and 612, and where $\rho_n$ represents the residual noise factor calculated at block 614. Smoothing and residual noise application are optional in certain embodiments.

At block 620, a discrete Gabor expansion or inverse transform is computed from the coefficients obtained in equation (20) to obtain a clean voice time waveform. This time waveform is provided as an output signal at block 622.

Although described as a sequential process, certain aspects of the process 600 may be performed concurrently. For instance, the transformed microphone signals can be combined together at block 616 in one processor or processor core while the noise filter is constructed at blocks 610 through 614 in another processor or processor core. Likewise, the Gabor transform applied at blocks 606 and 608 can be performed concurrently in separate cores or processors.

V. Example Waveforms

Figure 7:
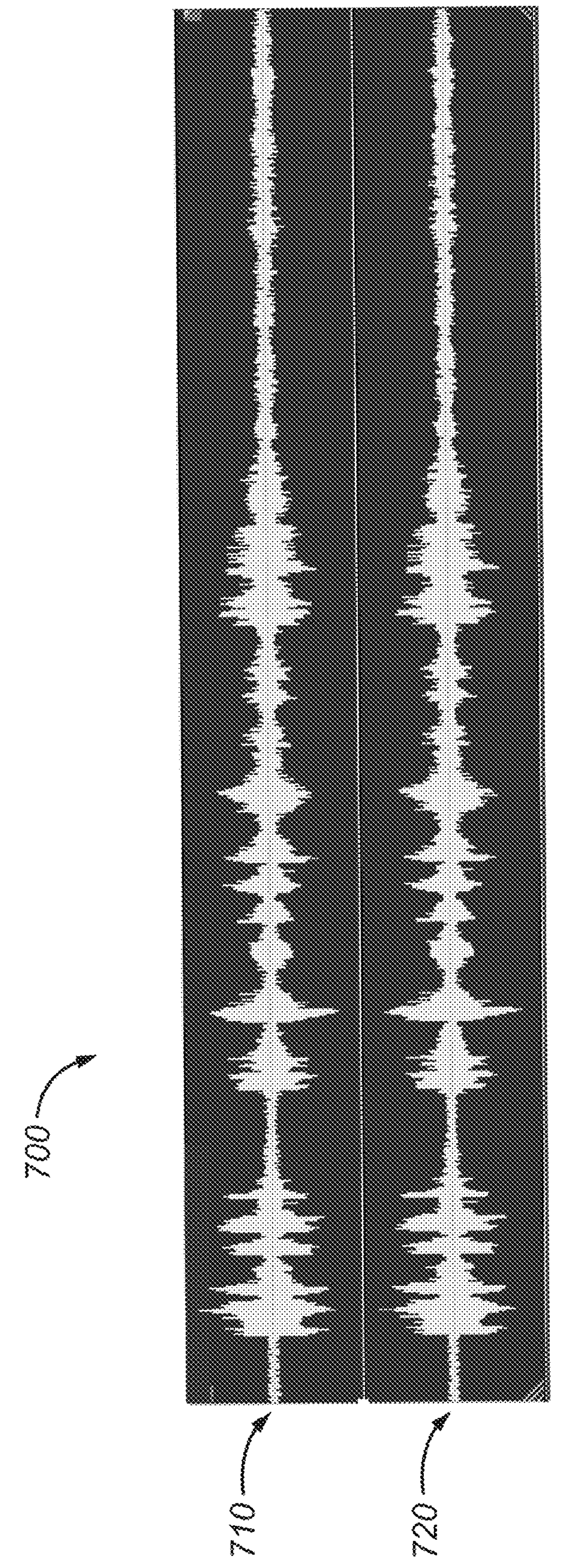
FIG. 7 illustrates example input audio waveforms obtained from a microphone array.
Figure 8:
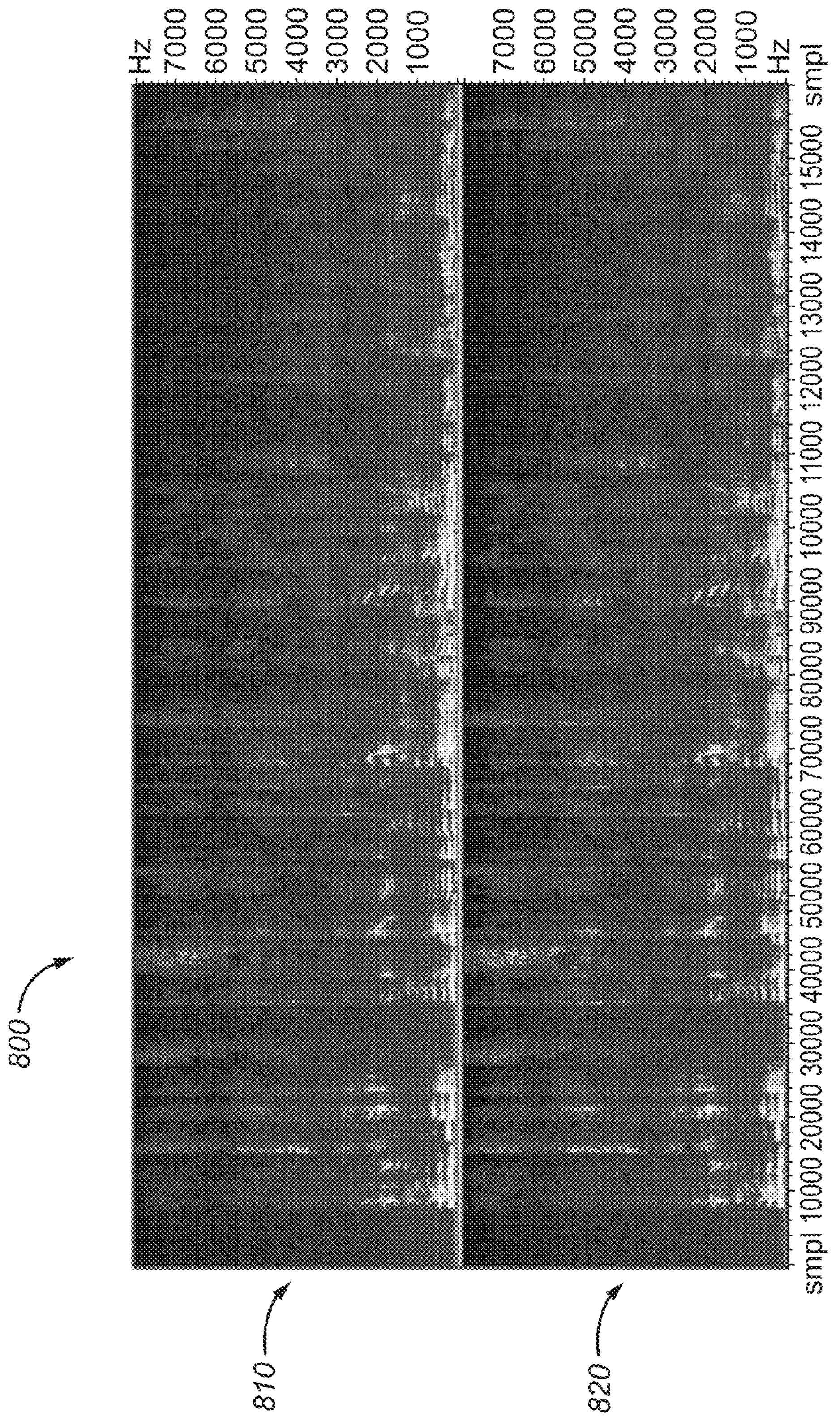
FIG. 8 illustrates example spectrograms corresponding to the input audio waveforms of FIG. 7.

FIG. 7 illustrates example input audio waveforms 700 obtained from a microphone array. These waveforms include a first microphone waveform 710 and a second microphone waveform 720. As shown, each waveform 710, 720 is at least partially corrupted by noise. FIG. 8 illustrates example spectrograms 800 corresponding to the input audio waveforms of FIG. 7. In particular, a spectrogram 810 corresponds to the waveform 710, and a spectrogram 820 corresponds to the waveform 720. The spectrograms 800 illustrate a time-frequency domain representation of the waveforms 700.

Figure 9:
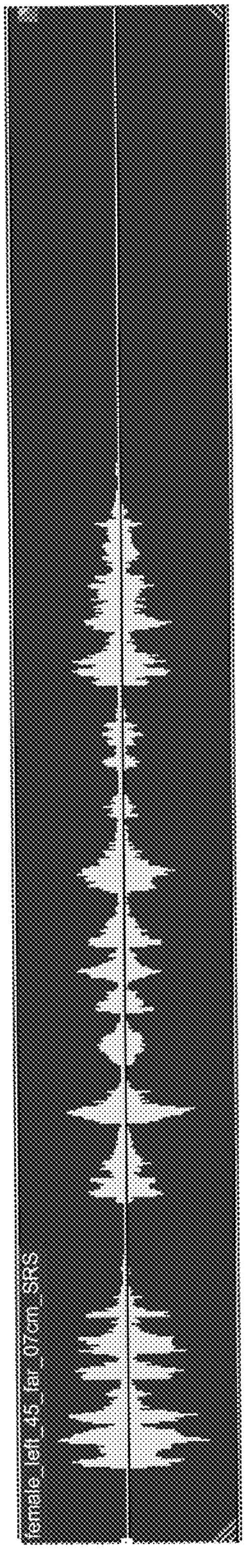
FIG. 9 illustrates a processed waveform derived by processing the input audio waveforms of FIG. 7.
Figure 10:
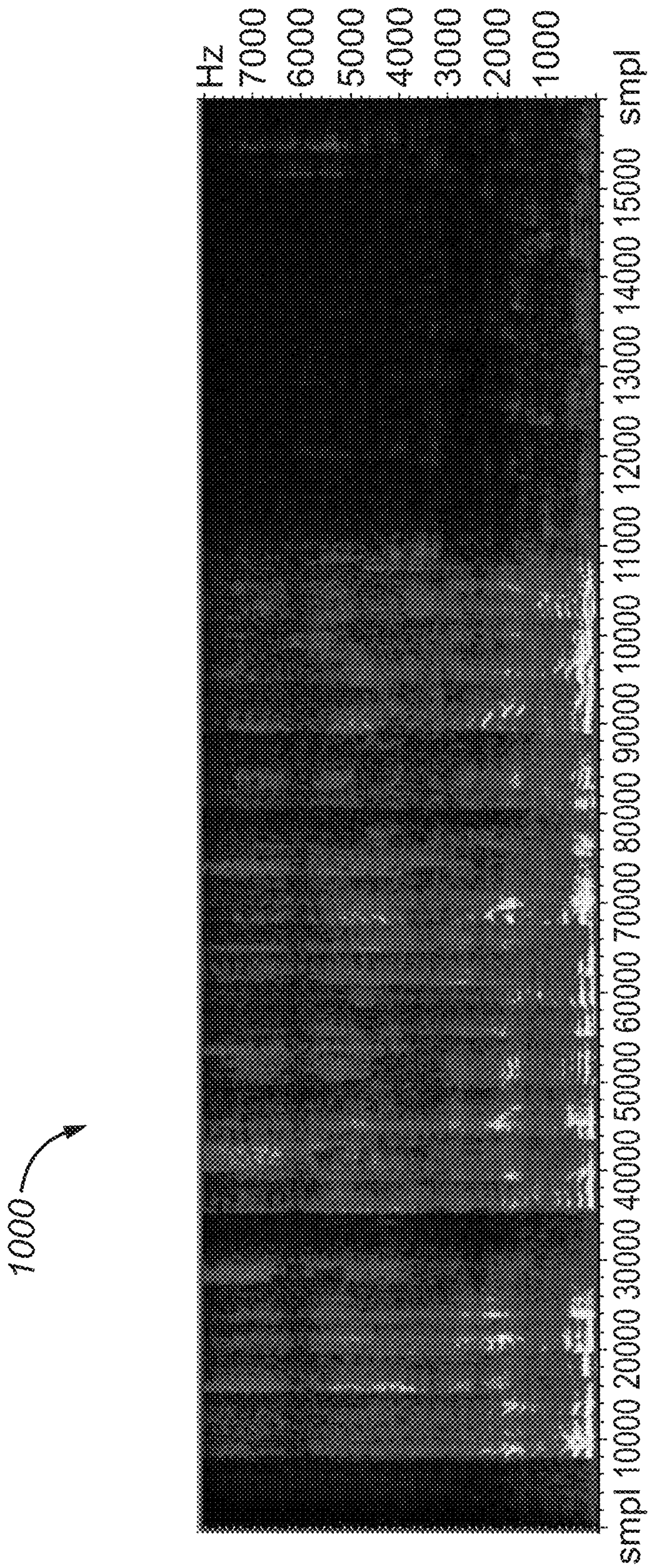
FIG. 10 illustrates a spectrogram of the processed waveform of FIG. 9.

In contrast, FIG. 9 illustrates a processed waveform 900 derived by processing the input audio waveforms 700 of FIG. 7 using, for example, the process 600 described above. Visual comparison of the processed waveform 900 and the input waveforms 700 shows that the processed waveform 900 has significantly less noise than the input waveforms 700. Likewise, a spectrogram 1000 of the processed waveform 900 shown in FIG. 10 illustrates a cleaner time-frequency representation of the processed waveform 900 than the spectrograms 800 of the input waveforms 700. In this particular example, noise throughout the spectrum has also been attenuated, and extensive attenuation occurs in the time domain from about samples 110000 on.

VI. Additional Embodiments

As described above with respect to FIG. 6, the transformed microphone signals can be combined adaptively or in a fixed fashion. For example, the Gabor coefficients, $\mathbf{c1}_{m,n}$ and $\mathbf{c2}_{m,n}$, are combined by an adaptive filter in equation (16), reproduced here as equation (21):

$$\hat{c}_{m,n}=d1_{m,n}c1_{m,n}+d2_{m,n}c2_{m,n} \qquad (21)$$

While the coefficients $\mathbf{d1}_{m,n}$ and $\mathbf{d2}_{m,n}$ can be fixed to a value of 0.5 in embodiments where the user is directly in front of the microphones, in other embodiments, these values may vary. One particular application where it may be desirable to vary these values is in conference call applications.

A conference call phone may have multiple microphones that are placed omnidirectionally to enable users around a table to talk into the conference call phone. In one embodiment, one or more video cameras may be provided with the conference call phone, which detects who in a conference is speaking (e.g., by using mouth movement detection algorithms). The one or more video cameras can provide x, y coordinates (or other coordinates) indicating an approximate speaker location to the beamforming system 110. In another embodiment, microphones in the conference call phone itself determine an approximate direction of the user who is speaking and report this information to the beamforming system 110. The beamforming system 110 can use this speaker location information to adjust the audio beam to selectively emphasize voice from the speaker while attenuating noise in other directions. For example, the beamforming system 110 may calculate new coefficients $\mathbf{d1}_{m,n}$ and $\mathbf{d2}_{m,n}$ based on x, y coordinate information input to the beamforming system 110. In a two-microphone conference call device, for instance, the beamforming system 110 can emphasize a left microphone's Gabor coefficients when a person to the left is speaking, and the like.

Similarly, the analysis component 114 can construct a noise filter differently from the techniques described above based on the location of a person speaking. Instead of emphasizing time-frequency subcomponents that correspond to a low phase difference between microphone channels, for instance, the analysis component 114 can emphasize (through weighting) time-frequency components that correspond to a phase that approximates a location of the person speaking. In another embodiment, the analysis component 114 can make adjustments to the value of $\alpha$ in equation (8) and/or (10) to steer the beam toward the speaker. The analysis component 114 may also make similar adjustments to the noise filter based on differences in magnitude in addition to or instead of differences in phase.

VII. References

The beamforming system 110 or process 600 can implement any of the features disclosed in the following references together with any of the features described herein:

1. D. Gabor, "Theory of communication," J. IEE, vol. 93, no. III, pp. 429-457, London, November, 1946.
2. M. J. Bastiaans, "Gabor's expansion of a signal into Gaussian elementary signals," Proceedings of the IEEE, vol. 68, pp. 538-539, April 1980.
3. J. Wexler and S. Raz, "Discrete Gabor expansions," Signal Processing, vol. 21, no. 3, pp. 207-221, November 1990.
4. S. Qian and D. Chen, "Discrete Gabor transform," IEEE Trans. Signal Processing, vol. 41, no. 7, pp. 2429-2439, July 1993.
5. S. Qian, *Introduction to Time-Frequency and Wavelet Transforms*, Englewood Cliffs, N.J.: Prentice-Hall, 2001.

Each of the foregoing references is hereby incorporated by reference in its entirety.

VIII. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of reducing noise using a plurality of microphones, the method comprising:

receiving a first audio signal from a first microphone in a microphone array;

receiving a second audio signal from a second microphone in the microphone array, one or both of the first and second audio signals comprising voice audio;

applying a Gabor transform to the first audio signal to produce first Gabor coefficients with respect to a set of frequency bins;

applying the Gabor transform to the second audio signal to produce second Gabor coefficients with respect to the set of frequency bins;

computing, for each of the frequency bins, a difference in phase, magnitude, or both phase and magnitude between the first and second Gabor coefficients;

determining, for each of the frequency bins, whether the difference meets a threshold;

for each of the frequency bins in which the difference meets the threshold, assigning a first weight, and for each of the frequency bins in which the difference does not meet the threshold, assigning a second weight;

forming an audio beam by at least (1) combining the first and second Gabor coefficients to produce combined Gabor coefficients and (2) applying the first and second weights to the combined Gabor coefficients to produce overall Gabor coefficients; and applying an inverse Gabor transform to the overall Gabor coefficients to obtain an output audio signal;

wherein said combining the first and second Gabor coefficients and said applying the first and second weights to the combined Gabor coefficients cause the output audio signal to have less noise than the first and second audio signals; and wherein the method is implemented by a hardware processor.

2. The method of claim 1, wherein said computing the difference comprises computing the difference in phase when the first and second microphones are configured in a broadside array.

3. The method of claim 2, wherein the broadside array is installed in a laptop or tablet computing device.

4. The method of claim 1, wherein said computing the difference comprises computing the difference in magnitude when the first and second microphones are configured in an end-fire array.

5. The method of claim 4, wherein the end-fire array is installed in a mobile phone.

6. The method of claim 1, wherein said forming the audio beam comprises adaptively combining the first and second Gabor coefficients based at least partly on the assigned first and second weights.

7. The method of claim 1, further comprising smoothing the first and second weights with respect to both time and frequency prior to applying the first and second weights to the combined Gabor coefficients.

8. A system for reducing noise using a plurality of microphones, the system comprising:

- a transform component configured to apply a time-frequency transform to a first microphone signal to produce a first transformed audio signal in a time-frequency domain and to apply the time-frequency transform to a second microphone signal to produce a second transformed audio signal in the time-frequency domain;
- an analysis component configured to compare differences in one or both of phase and magnitude between the first and second transformed audio signals in the time-frequency domain and to calculate noise filter parameters based at least in part on the differences;
- a signal combiner configured to combine the first and second transformed audio signals to produce a combined transformed audio signal;
- a time-frequency noise filter implemented in one or more processors, the time-frequency noise filter configured to filter the combined transformed audio signal based at least partly on the noise filter parameters to produce an overall transformed audio signal; and
- an inverse transform component configured to apply an inverse transform to the overall transformed audio signal from the time-frequency domain to a time domain to obtain an output audio signal.

9. The system of claim 8, wherein the analysis component is configured to calculate the noise filter parameters to enable the noise filter to attenuate portions of the combined transformed audio signal based on the differences in phase, wherein the noise filter applies more attenuation for relatively larger differences in the phase and less attenuation for relatively smaller differences in the phase.

10. The system of claim 8, wherein the analysis component is configured to calculate the noise filter parameters to enable the noise filter to attenuate portions of the combined transformed audio signal based on the differences in magnitude, wherein the noise filter applies less attenuation for relatively larger differences in the magnitude and more attenuation for relatively smaller differences in the magnitude.

11. The system of claim 8, wherein the analysis component is further configured to compare the differences in phase between the first and second transformed audio signals by computing an argument of a combination of the first and second transformed audio signals.

12. The system of claim 8, wherein the analysis component is further configured to compare the differences in magnitude between the first and second transformed audio signals by computing a ratio of the first and second transformed audio signals.

13. The system of claim 8, wherein the signal combiner is further configured to combine the first and second transformed audio signals adaptively based at least partly on the differences identified by the analysis component.

14. The system of claim 8, wherein said time-frequency transform comprises one or more of the following: a Gabor transform, a short-time Fourier transform, a wavelet transform, and a chirplet transform.

15. Non-transitory physical computer storage configured to store instructions that, when implemented by one or more processors, cause the one or more processors to implement operations for reducing noise using a plurality of microphones, the operations comprising:

- receiving a first audio signal from a first microphone positioned at an electronic device;
- receiving a second audio signal from a second microphone positioned at the electronic device;
- transforming the first audio signal into a first transformed audio signal in a time-frequency domain;
- transforming the second audio signal into a second transformed audio signal in the time-frequency domain;
- comparing a difference between the first and second transformed audio signals in the time-frequency domain;
- constructing a noise filter based at least in part on the difference; and
- applying the noise filter to a combination of the first and second transformed audio signals to produce noise-filtered audio signal; and
- transforming the noise-filtered audio signal from the time-frequency domain to a time domain to produce an output noise-filtered audio signal.

16. The non-transitory physical computer storage of claim 15, wherein the operations further comprise smoothing parameters of the noise filter prior to applying the noise filter.

* * * * *